(12) United States Patent
Flaster et al.

(10) Patent No.: US 7,436,310 B2
(45) Date of Patent: Oct. 14, 2008

(54) PATCH PANEL COVER MOUNTED ANTENNA GRID FOR USE IN THE AUTOMATIC DETERMINATION OF NETWORK CABLE CONNECTIONS USING RFID TAGS

(75) Inventors: Michael E Flaster, Tenafly, NJ (US); Clifford E Martin, Martinsville, NJ (US); Wee Teck Ng, Berkeley Heights, NJ (US); Cuong Tran, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 226 days.

(21) Appl. No.: 11/392,296

(22) Filed: Mar. 29, 2006

(65) Prior Publication Data

US 2007/0236355 A1 Oct. 11, 2007

(51) Int. Cl.
*G08B 13/14* (2006.01)

(52) U.S. Cl. .............. 340/572.8; 340/686.1; 340/572.1; 340/687; 439/488

(58) Field of Classification Search .............. 340/10.31, 340/10.1, 10.32, 10.52, 10.42, 572.8, 572.1, 340/572.6, 686.1, 687, 568.1, 568.2; 439/488, 439/49, 607; 235/451, 385, 375, 435; 343/853, 343/893

See application file for complete search history.

(56) References Cited

U.S. PATENT DOCUMENTS

| | | | |
|---|---|---|---|
| 5,784,686 A | 7/1998 | Wu et al. | 455/45 |
| 5,910,776 A | 6/1999 | Black | 340/825.35 |
| 5,952,922 A | 9/1999 | Shober | 340/572.4 |
| 6,084,530 A | 7/2000 | Pidwerbetsky et al. | 340/825.54 |
| 6,130,623 A | 10/2000 | MacLellan et al. | 340/825.54 |
| 6,184,841 B1 | 2/2001 | Shober et al. | 343/853 |
| 6,243,012 B1 | 6/2001 | Shober et al. | 340/572.7 |
| 6,784,802 B1* | 8/2004 | Stanescu | 340/687 |
| 6,847,856 B1 | 1/2005 | Bohannon | 700/115 |
| 6,968,994 B1 | 11/2005 | Ashwood Smith | 235/375 |
| 7,170,393 B2* | 1/2007 | Martin | 340/10.1 |
| 2005/0215119 A1* | 9/2005 | Kaneko | 439/607 |
| 2005/0219050 A1 | 10/2005 | Martin | 340/572.1 |
| 2006/0148279 A1* | 7/2006 | German et al. | 439/49 |

* cited by examiner

*Primary Examiner*—Anh V La
(74) *Attorney, Agent, or Firm*—Kenneth M. Brown

(57) ABSTRACT

An RF antenna grid design in which the antenna array is installed on a patch panel cover allows for the retrofitting of an RF antenna grid on existing patch panel based systems without disrupting network operation. An apparatus for determining connectivity between device ports on a patch panel and cable ends having corresponding RFID tags attached thereto comprises a patch panel having a plurality of device ports and a patch panel cover comprising a plurality of RFID antennas, where each of the RFID antennas comprises one or more protruding portions thereof, each of the protruding portions of the RFID antennas being in close physical proximity to one or more of the plurality of device ports when the patch panel cover is positioned in a fixed positional relationship to the patch panel (e.g., when the patch panel cover is "attached" to the patch panel).

20 Claims, 5 Drawing Sheets

PATCH PANEL COVER MOUNTED ANTENNA GRID FOR USE IN THE AUTOMATIC DETERMINATION OF NETWORK CABLE CONNECTIONS USING RFID TAGS

FIELD OF THE INVENTION

The present invention relates generally to the field of Radio Frequency Identification (RFID) systems and more particularly to the use of RFID techniques for the automatic determination of network cable connections.

BACKGROUND OF THE INVENTION

The management of complicated networks such as telecommunications networks or sophisticated computer networks is tremendously expensive. A substantial portion of this cost arises from incomplete, incorrect or ambiguous knowledge about a network. For example, a telecommunications network operator may not have an accurate record of how network switches are configured, leading to failed attempts to fix problems or provision new services. This lack of knowledge can in some instances be remedied by polling the networking equipment to determine its actual settings.

However, a more fundamental ambiguity arises at the physical level of network cable management. Network cables may be added, removed or moved by support personnel for a variety of reasons, often to solve urgent problems. However, it is very difficult to maintain an accurate record of exactly which cable is connected to which port of a given piece of equipment (e.g., a patch panel of a telecommunications switch), since the cables may so easily be connected, disconnected, and reconnected.

Typically, network cable locations and connections are tracked manually, by, for example, putting printed tags on each cable, storing the tag-to-cable mappings in a database, and then attempting to manually keep the database up to date. In addition, physical inventories of network offices, in which the cables are identified, tagged and mapped, are themselves typically performed manually. In a large telecommunications or computer network system, it is an extremely expensive proposition to keep track of every cable, where it is, where it runs, and which port on a given piece of equipment it is plugged into. As a result, equipment inventory databases are notoriously inaccurate, and the negative results include, inter alia, loss of network capacity, increased service times and a much greater chance of disruptive service errors. Thus, it would be highly advantageous if there were an automated mechanism able to identify the connections between cables and equipment ports of a given piece of equipment such as, for example, a patch panel of a telecommunications switch.

One approach is to use Radio Frequency Identification (RFID) systems for the automatic determination of cable connections, by employing RFID tags on both cable ends and equipment ports, determining each of their respective locations (with use of one or more RFID sensing devices), and then determining the physical proximity therebetween. Based on this determined physical proximity, juxtaposition (e.g., a connection) between the cable and the port can be determined. This approach is described in detail in U.S. Pat. No. 6,847,856, "Method For Determining Juxtaposition Of Physical Components With Use Of RFID Tags" by Philip L. Bohannon, issued Jan. 25, 2005 and commonly assigned to the assignee of the present invention. U.S. Pat. No. 6,847,856 is hereby incorporated by reference as if fully set forth herein.

Another approach to the use of Radio Frequency Identification (RFID) systems for the automatic determination of cable connections might comprise the use of RFID tags on each cable end and a single, independent receiver (e.g., antenna) at (or near to) each device port. Then, the specific cable end that is connected to each device port (if any) can be advantageously determined by merely reading the ID value of the connected cable end. This, however, might be prohibitively expensive. (As is familiar to those of ordinary skill in the art, whereas RFID tags are extremely inexpensive, RFID readers are typically not so inexpensive.)

A better approach is to use an RF antenna grid, employed on a device having a plurality of device ports (e.g., cable end connection points), which may, for example, be physically organized in a two-dimensional rectangular arrangement. (As used herein, a "device port" is any physical receptacle into which an end of a cable may be connected. The receptacle and cable may, for example, be adapted to carry electrical or optical signals, but they are not necessarily limited thereto. Also as used herein, the term "antenna grid" is not meant to imply any particular arrangement of antennas or device ports to which it is employed, but rather represents any antenna arrangement in which either multiple device ports are associated with a given RFID antenna and/or in which two or more distinct antennas are associated with a given device port.) In particular, each of the RFID antennas may be advantageously located on the device such that it is in close physical proximity to each of two or more device ports. (As used herein, the term "close physical proximity" between an RFID antenna and a device port is defined by the ability of the RFID antenna to sense the presence of an RFID tag attached to a cable end which has been plugged into the device port when directed to do so by an RFID reader.)

This is the approach employed in co-pending U.S. patent application Ser. No. 10/812,598, "Method And Apparatus For The Automatic Determination Of Network Cable Connections Using RFID Tags And An Antenna Grid," filed on Mar. 30, 2004 by Clifford E. Martin (hereinafter, "Martin") and commonly assigned to the assignee of the present invention. In particular, Martin discloses a method and apparatus whereby an RF antenna grid is advantageously employed on a device (e.g., a patch panel) having a plurality of device ports (e.g., cable connection points) which may, for example, be physically organized in a two-dimensional rectangular arrangement. Then, when RFID tags have been fixed to one or more cable ends, it can advantageously be determined which of the one or more cables are connected to which of the device ports on the patch panel. The RF antenna grid may comprise a plurality of individual antennas which are advantageously multiplexed such that a single RFID reader can handle the sensing for all antennas. U.S. patent application Ser. No. 10/812,598 is hereby incorporated by reference as if fully set forth herein.

Although the RF antenna grid design described in Martin solves the problem of automatically determining network connections, that approach cannot be easily employed with respect to existing patch panel systems used in current telecommunications networks without disrupting network operations. In particular, such a design may require the forklift replacement of existing patch panels with electronic switches or proprietary patch panels. Such an approach, which requires a retrofitting of major telecommunications equipment components can prove to be quite costly.

SUMMARY OF THE INVENTION

We have recognized that an RF antenna grid design in which the antenna array is installed on a patch panel cover, rather than on the patch panel itself, advantageously allows for the retrofitting of an RF antenna grid on existing patch panel based systems without disrupting network operation. In accordance with the principles of the present invention, therefore, an apparatus for determining connectivity between one or more device ports thereof and one or more cable ends having corresponding RFID tags attached thereto comprises a patch panel having a plurality of device ports and a patch panel cover comprising a plurality of RFID antennas, where each of the RFID antennas comprises one or more protruding portions thereof, each of the protruding portions of the RFID antennas being in close physical proximity to one or more of the plurality of device ports when the patch panel cover is positioned in a fixed positional relationship to the patch panel (e.g., when the patch panel cover is "attached" to the patch panel).

DETAILED DESCRIPTION OF THE PREFERRED EMBODIMENTS

Figure 1:
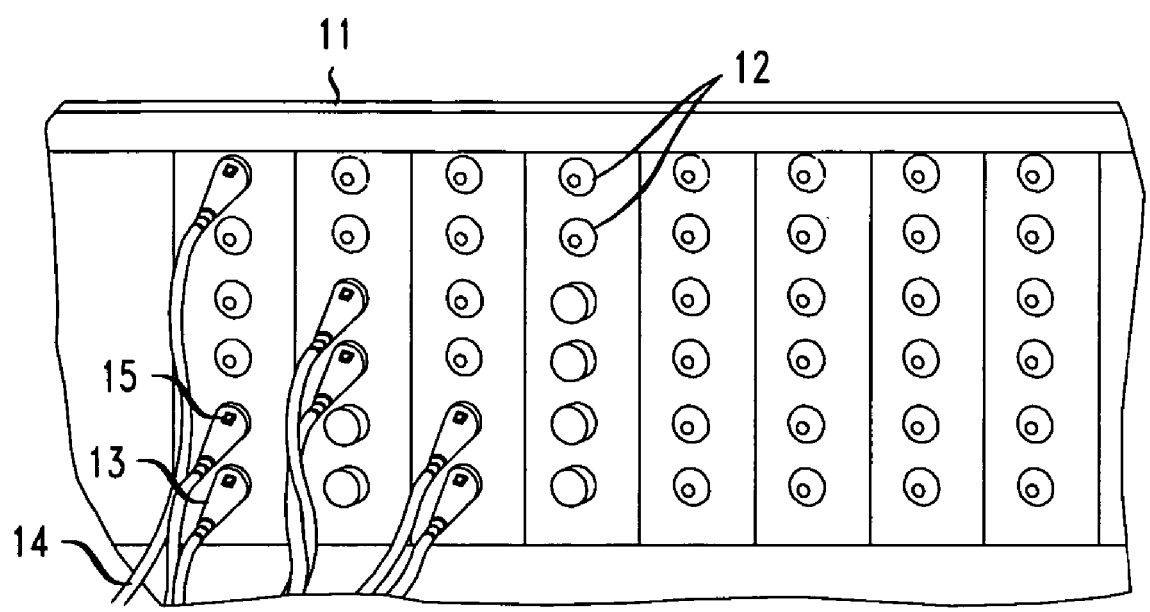
FIG. 1 shows an example of a patch panel having cable ends with RFID tags attached thereto, the cable ends plugged into patch panel device ports, the patch panel for use with a patch panel cover in accordance with an illustrative embodiment of the present invention.

In accordance with the principles of the present invention, an RF antenna grid array is installed on a patch panel cover in such a manner as to enable the sensing of RFID tags attached to cable ends which have been plugged into device ports on a patch panel, when the patch panel cover is affixed to the patch panel. In particular, the RF antennas advantageously comprise protruding portions thereof to enable such sensing of the RFID tags. Note that as used herein, the term "patch panel" encompasses any physical object which comprises a plurality of device ports, each of which is capable of having a cable end attached thereto; and the term "patch panel cover" encompasses any physical object which is capable of being physically attached or connected to a patch panel.

In accordance with one illustrative embodiment of the invention, a patch panel comprising a rectangular array of device ports has a patch panel cover attached thereto, wherein a RF antenna grid comprising a plurality of row antennas and a plurality of column antennas is installed on the patch panel cover. In particular, in accordance with this illustrative embodiment of the invention, each of the column antennas advantageously protrude from the cover in a large (e.g., wide) "U" shape, with the ends of the "U" shaped antenna being attached at a corresponding top and bottom portion of the cover, respectively, such that each of the given column antennas are in close proximity to each device port in a given column of the patch panel's device ports when the cover is affixed to the patch panel. In addition, in accordance with this illustrative embodiment of the invention, each of the row antennas advantageously comprises a series of protruding portions, each protruding portion protruding from the cover in a small (e.g., narrow) "U" shape which is advantageously twisted, by an amount approximately equal to 90 degrees, to be parallel to the column antennas, such that each protruding portion is in close proximity to a device port in a corresponding row of the patch panel's device ports when the cover is affixed to the patch panel; and moreover, such that each of the given row antennas is in close proximity to each device port in the given row of the patch panel's device ports when the cover is affixed to the patch panel.

The twisted "U" shape design of the illustrative embodiment of the present invention advantageously minimizes contact with existing cables, advantageously extends the detection range of the row antennas, and advantageously aligns the row antennas with the column antennas so as to enable the detection of RFID tags oriented parallel to the column and row antennas. In accordance with certain illustrative embodiments of the present invention, the detection range of the antennas may be advantageously tuned so that a single column or row of RFID tags may be detected. For example, in accordance with one illustrative embodiment of the invention, the detection range may be adjusted by varying the power supplied to the antennas, shaping the antennas to focus the antenna detection field onto the tags, and taking advantage of well-known antenna coupling effects.

FIG. 1 shows an example of a patch panel having cable ends with RFID tags attached thereto, the cable ends plugged into patch panel device ports, the patch panel for use with a patch panel cover in accordance with an illustrative embodiment of the present invention. The illustrative patch panel (i.e., patch panel 11), as shown in the figure, comprises a rectangular array of device ports 12 (i.e., jacks), some of which have corresponding cable ends 13 (i.e., plugs) terminating corresponding cables 14. Each cable end 13 has attached thereto a corresponding RFID tag 15.

Figure 2:
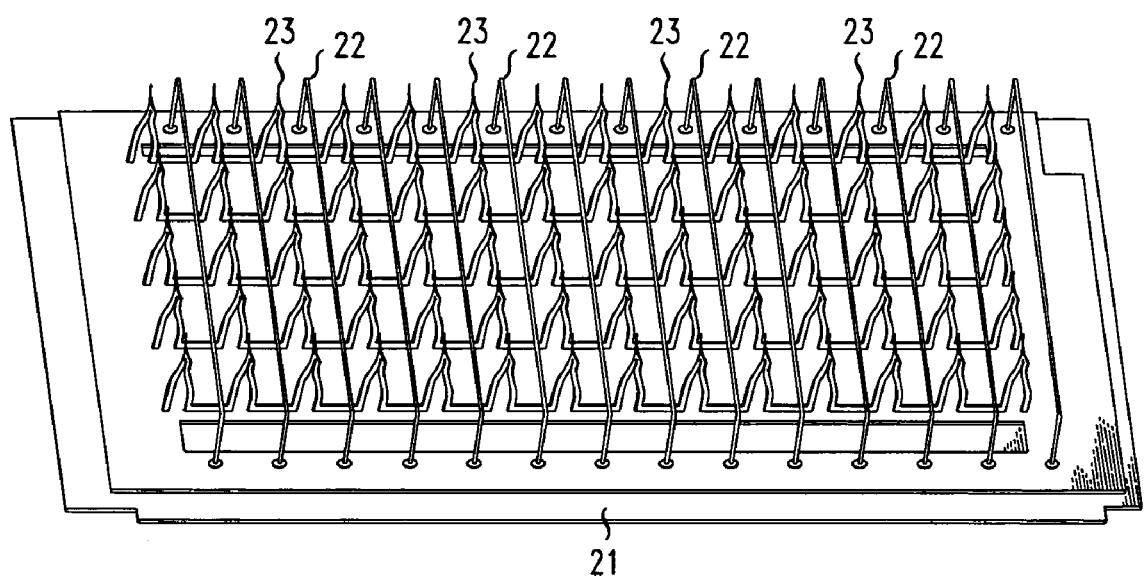
FIG. 2 shows a patch panel cover having an RF antenna grid for use in the automatic determination of network cable connections according to one illustrative embodiment of the present invention.

FIG. 2 shows a patch panel cover having an RF antenna grid for use in the automatic determination of network cable connections according to one illustrative embodiment of the present invention. The illustrative patch panel cover (i.e., patch panel cover 21), as shown in the figure, comprises a plurality of column antennas 22 and a plurality of row antennas 23. In accordance with the illustrative embodiment of the present invention as shown in FIG. 2, each of the column antennas advantageously protrude from the cover in a large "U" shape, with the ends of the "U" shaped antennas being attached at a corresponding top and bottom portion of the cover, respectively, as described above. In addition, in accordance with this illustrative embodiment of the invention as shown in FIG. 2, each of the row antennas advantageously comprises a series of protruding portions, each protruding portion protruding from the cover in a "U" shape which is advantageously twisted to be parallel to the column antennas, as described above.

Figure 3:
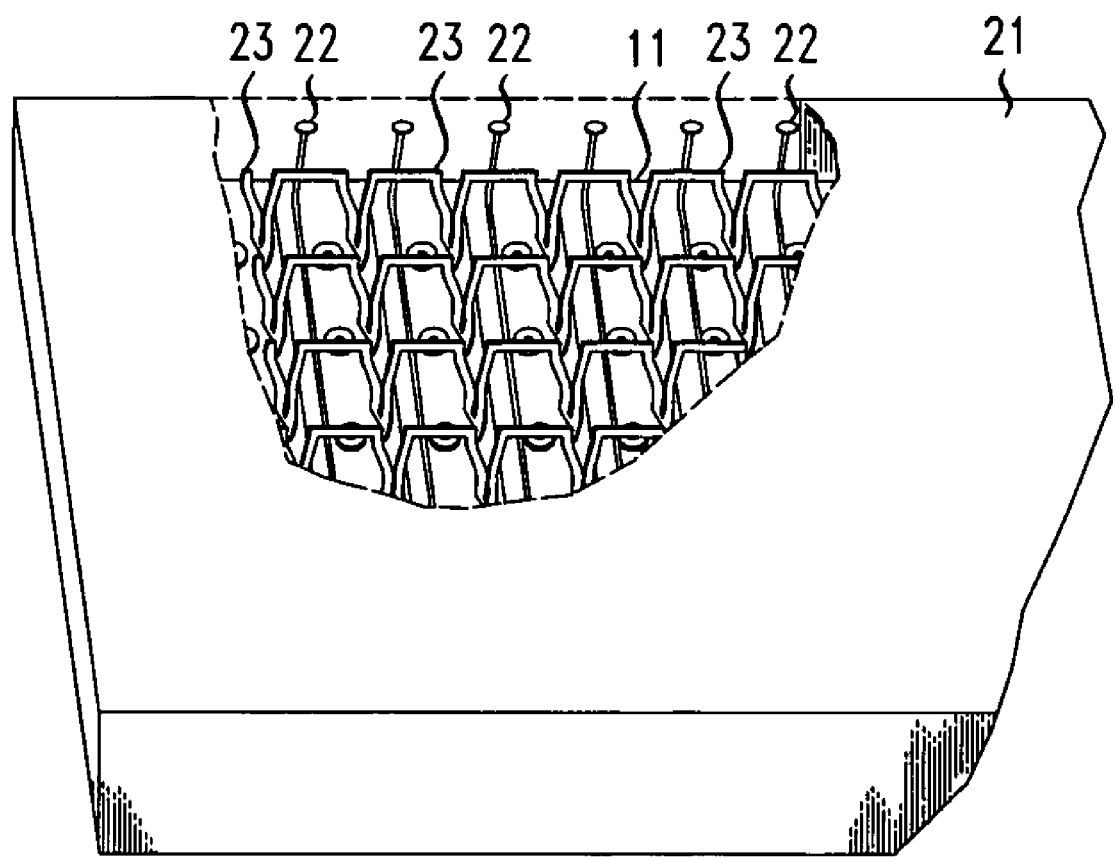
FIG. 3 shows the patch panel cover of FIG. 2 affixed to the patch panel of FIG. 1 in accordance with an illustrative embodiment of the present invention.

FIG. 3 shows the patch panel cover of FIG. 2 affixed to the patch panel of FIG. 1 in accordance with an illustrative embodiment of the present invention. When the patch panel cover of FIG. 2 (i.e., patch panel cover 21) is affixed (e.g., in a fixed, predetermined positional relationship) to the patch panel of FIG. 1 (i.e., patch panel 11), each one of column antennas 22 is advantageously in close proximity to each device port in a corresponding column of the patch panel's device ports. (A portion of patch panel cover 21 is shown in "cut-away.") Similarly, when the patch panel cover of FIG. 2 (i.e., patch panel cover 21) is affixed (e.g., in the fixed, predetermined positional relationship) to the patch panel of FIG. 1 (i.e., patch panel 11), each one of row antennas 23 is advantageously in close proximity to each device port in a corresponding row of the patch panel's device ports. In particular, each protruding portion of a given row antenna is in close proximity to a corresponding one of the device ports located in the corresponding row of the patch panel's device ports.

Figure 4:
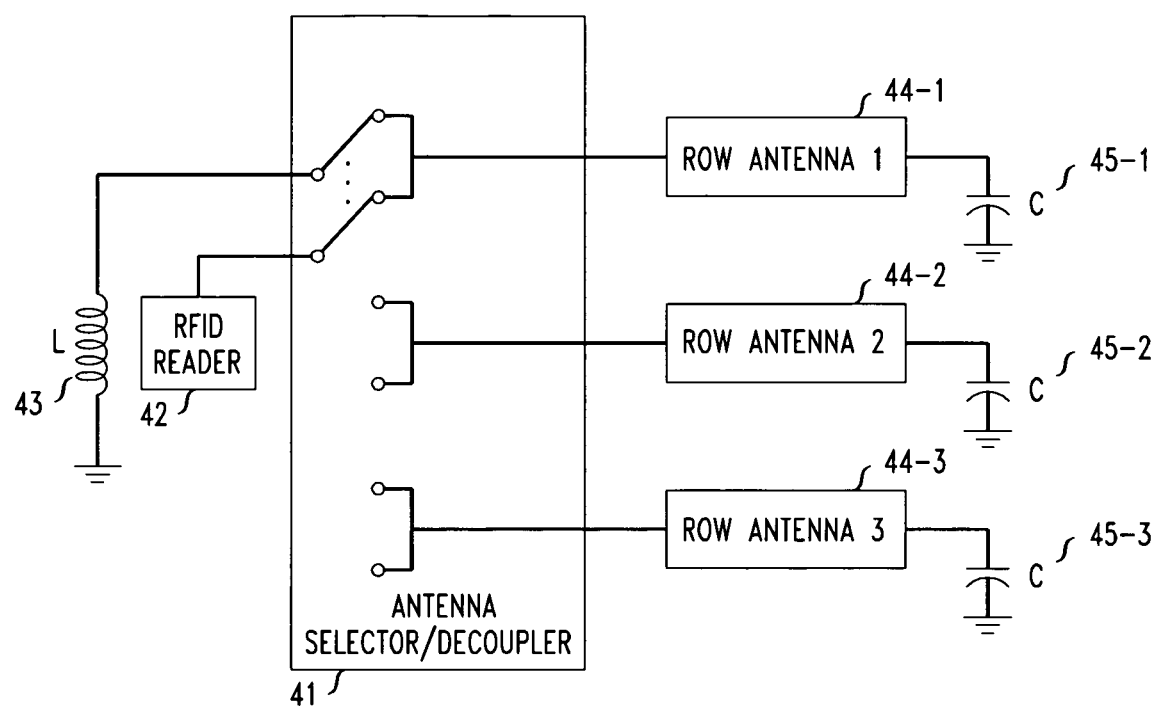
FIG. 4 shows an illustrative antenna selector configuration which may be used for selecting the sensing of one of a plurality of antennas of the patch panel cover of FIG. 2 in accordance with one illustrative embodiment of the present invention.

FIG. 4 shows an illustrative antenna selector configuration which may be used for selecting the sensing of one of a plurality of antennas of the patch panel cover of FIG. 2 in accordance with one illustrative embodiment of the present invention. The illustrative antenna selector of FIG. 4 advantageously eliminates antenna coupling effects with use of a simple on-off switch. As can be seen from the figure, this switch may be advantageously integrated with an antenna selector/multiplexer with minimal cost by using a dual switch.

In particular, the illustrative antenna selector configuration of FIG. 4 comprises an antenna selector/decoupler 41, advantageously implemented as a dual switch, which is connected to RFID reader 42, via one of the dual switch paths, and to grounded inductor 43 (i.e., "L"), via the other one of the dual switch paths. In addition, each of the multiple selector terminals of antenna selector/decoupler 41 is connected to a corresponding one of the (illustratively, three) row antennas (row antennas 44-1, 44-2 and 44-3, respectively), which are shown as being, in turn, connected to grounded capacitors 45-1, 45-2 and 45-3, respectively. In operation of the illustrative antenna selector configuration of FIG. 4, each one of the plurality of row antennas 44 may be individually selected for reading by RFID reader 42.

In accordance with one illustrative embodiment of the present invention, it can also be easily determined (e.g., without requiring a database lookup) that a given pair of device ports are in fact connected to each other (by means of a cable). In a similar manner to that of the technique described in Martin, if, as described above, one end of each cable has been assigned a unique even number as its ID value, while the other end of the corresponding cable has been assigned the same number plus one as its (unique) ID value, then by "masking off" the least significant bit of the ID values which have been determined to be connected to various device ports (i.e., subtracting one from the value if and only if the value is odd), and by then testing each pair of such "masked off" values for equality, it can be easily determined which device ports are connected to each other without requiring a database access to associate the opposing ends of a given cable with one another.

Figure 5:
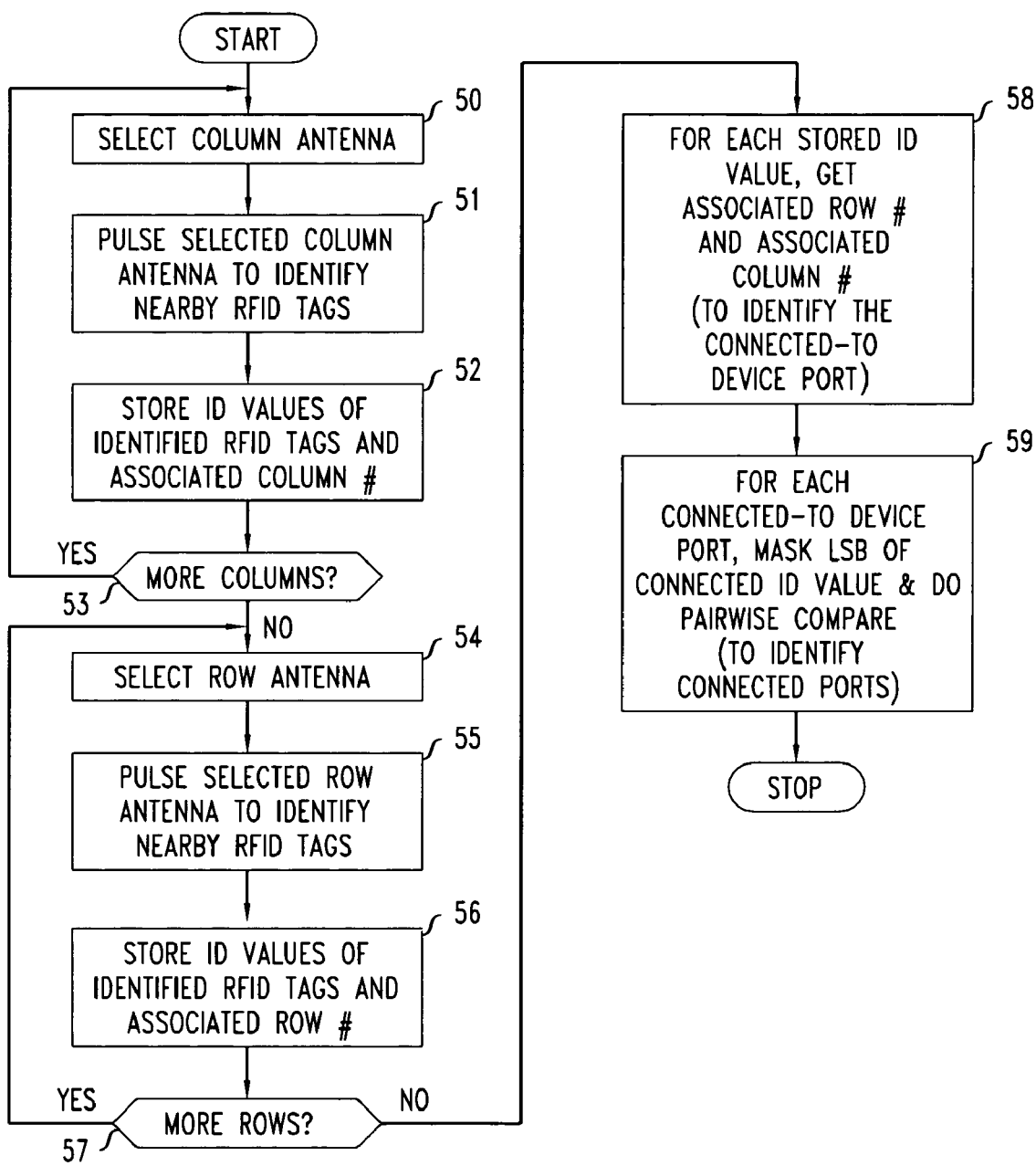
FIG. 5 shows a flowchart of a sample method for the automatic determination of network cable connections in accordance with an illustrative embodiment of the present invention.

FIG. 5 shows a flowchart of a sample method for the automatic determination of network cable connections in accordance with an illustrative embodiment of the present invention. In flowchart block 50, one of the column antennas is selected (e.g., with use of the illustrative antenna selector shown in FIG. 4). Then, in block 51, the selected column antenna is pulsed (e.g., under control of the illustrative RFID reader shown in FIG. 4) in order to identify RFID tags (presumably attached to corresponding cable ends) which are in close proximity to the selected column antenna and therefore may be assumed to be connected to one of the device ports in the given column. Next, in block 52, the ID values associated with the identified RFID tags (i.e., those in close proximity to the selected column antenna) are stored along with the associated column number ("column#") of the selected column antenna. This process (i.e., as performed in blocks 50-52) is repeated for each column antenna until it is determined by decision block 53 that all column antennas have been processed.

Once all of the column antennas have been processed, flowchart block 54 selects one of the row antennas (e.g., with use of the illustrative antenna selector shown in FIG. 4). Then, in block 55, the selected row antenna is pulsed (e.g., under control of the illustrative RFID reader shown in FIG. 4) in order to identify RFID tags (presumably attached to corresponding cable ends) which are in close proximity to the selected row antenna and therefore may be assumed to be connected to one of the device ports in the given row. Next, in block 56, the ID values associated with the identified RFID tags (i.e., those in close proximity to the selected row antenna) are stored along with the associated row number ("row#") of the selected row antenna. This process (i.e., as performed in blocks 54-56) is repeated for each row antenna until it is determined by decision block 27 that all row antennas have been processed.

Once all column antennas and all row antennas have been processed, block 58 of the flowchart examines the data which has been stored (in blocks 52 and 56) to find the associated row number and column number of each identified RFID tag (i.e., associated with each stored ID value). This identifies (by row number and column number) the connected-to device port. (The cable end to which is attached the RFID tag having the associated ID value is the cable end which is connected to the identified device port.) In one illustrative embodiment of the present invention, a database comprising information relating cable identities to associated RFID tag ID values may then be consulted to characterize the connection to the given device port.

And finally, in accordance with one illustrative embodiment of the present invention (see description above) and as shown in block 59 of the flowchart of FIG. 5, for each connected-to device port, the least significant bit (LSB) of the ID value of the RFID tag connected thereto is masked. Then, by performing a pair-wise comparison between these masked values, it can be easily determined (e.g., without a database lookup) which pairs of device ports are connected to one another.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope.

For example, the use of the terms "row" and "column" with respect to the RFID antennas of the illustrative embodiments of the present invention described herein are intended herein to be arbitrary—any spatial direction may be defined as a "row" and any other spatial direction may be defined as a "column" within the meaning of the terms as used herein. Moreover, there is no need for the antennas (or the device ports that they monitor) of the present invention to be arranged in a rectangular grid or, for that matter, in any particular spatial organization whatsoever. Similarly, any reference herein to a "top portion" or "bottom portion" of a patch panel cover shall be understood to also be arbitrary with respect to any particular spatial direction, and thus are to be understood as representing opposing sides of such a patch panel cover without regard to any particular direction or orientation.

Also, a "protruding portion" of an antenna having "a shape substantially equivalent to that of a letter 'U'" is intended to include within its meaning any shape which has three substantially linear portions (i.e., comprising an approximately straight line segment), two of which are parallel to each other and the third of which connects the other two at corresponding (i.e. rather than opposite) ends thereof. In other words, any "U" shape, regardless of how narrow or wide or short or tall, and regardless of the curvature or lack thereof at the connecting points of the three aforementioned linear portions thereof, is to be included within the meaning of the phrase "a shape substantially equivalent to that of a letter 'U'" as used herein.

In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

What is claimed is:

1. A patch panel cover for use in determining connectivity between one or more device ports comprised in a patch panel and one or more cable ends having corresponding RFID tags attached thereto, the one or more cable ends being connected to corresponding ones of said one or more device ports of said patch panel,
   the patch panel cover being a separate and distinct element from said patch panel and being attachable to and detachable from said patch panel,
   the patch panel cover comprising a plurality of RFID antennas, each of said RFID antennas comprising one or more protruding portions thereof, each of said protruding portions of said RFID antennas being in close physical proximity to one or more of said plurality of device ports when said patch panel cover is positioned in a fixed, predefined relationship to said patch panel.

2. The patch panel cover of claim 1 wherein said device ports of said patch panel are arranged in a substantially rectangular arrangement comprising a plurality of rows of said device ports and a plurality of columns of said device ports,
   wherein said plurality of RFID antennas comprises a plurality of row antennas and a plurality of column antennas,
   wherein each of said row antennas is in close physical proximity to each of said device ports in a corresponding one of said rows of said device ports when said patch panel cover is positioned in said fixed, predefined relationship to said patch panel, and
   wherein each of said column antennas is in close physical proximity to each of said device ports in a corresponding one of said columns of said device ports when said patch panel cover is positioned in said fixed, predefined relationship to said patch panel.

3. The patch panel cover of claim 2 wherein each of said column antennas comprises a single protruding portion thereof, said single protruding portion having two ends and a shape substantially equivalent to that of a letter "U", wherein said two ends of said single protruding portion are attached to said patch panel cover at a top portion and a bottom portion, respectively, thereof.

4. The patch panel cover of claim 2 wherein each, of said row antennas comprises a plurality of protruding portions thereof, each of said plurality of protruding portions having two ends and a shape substantially equivalent to that of a letter "U", said plurality of protruding portions connected in series such that at least one of said ends of each of said protruding portions is attached to an end of another one of said protruding portions.

5. The patch panel cover of claim 4 wherein each of said column antennas comprises a single protruding portion thereof, said single protruding portion having two ends and a shape substantially equivalent to that of a letter "U", wherein said two ends of said single protruding portion are attached to said patch panel cover at a top portion and a bottom portion, respectively, thereof.

6. The patch panel cover of claim 5 wherein each protruding portion of each of said column antennas has a middle portion between its two ends and each of said plurality of protruding portions comprised in each of said row antennas has a middle portion between its two ends,
   wherein said middle portion of said protruding portion of each of said column antennas is in close physical proximity to each of said device ports in said corresponding one of said columns of said device ports when said patch panel cover is positioned in said fixed, predefined relationship to said patch panel, and
   wherein said middle portions of each of said protruding portions of each of said row antennas is in close physical proximity to a corresponding one of said device ports in said corresponding one of said rows of said device ports when said patch panel cover is positioned in said fixed, predefined relationship to said patch panel.

7. The patch panel cover of claim 6 wherein the middle portions of each of said protruding portions of each of said row antennas is twisted by an amount approximately equal to 90 degrees, such that the middle portion of each of said protruding portions of each of said row antennas is substantially parallel to the middle portion of a corresponding one of said protruding portions of one of said column antennas.

8. The patch panel cover of claim 2 further comprising an antenna selector connected to each of said plurality of row antennas, the antenna selector for selecting one of said plurality of row antennas at a time for sensing RFID information therefrom.

9. The patch panel cover of claim 8 further comprising an RFID reader connected to said antenna selector, the RFID reader for reading said RFID information from one of said row antennas.

10. The patch panel cover of claim 9, wherein the antenna selector comprises a dual switch arrangement to reduce antenna coupling effects between said plurality of row antennas.

11. An apparatus for use in determining connectivity between one or more device ports and one or more cable ends having corresponding RFID tags attached thereto, the apparatus comprising:
    a patch panel, the patch panel comprising one or more of said device ports, one or more of said cable ends being connected to corresponding ones of said one or more device ports of said patch panel,
    a patch panel cover, the patch panel cover positioned in a fixed, predefined relationship to said patch panel, the patch panel cover comprising a plurality of RFID antennas, each of said RFID antennas comprising one or more protruding portions thereof, each of said protruding portions of said RFID antennas being in close physical proximity to one or more of said plurality of device ports, the patch panel cover being a separate and distinct element from said patch panel and being attachable to and detachable from said patch panel.

12. The apparatus of claim 11 wherein said device ports of said patch panel are arranged in a substantially rectangular arrangement comprising a plurality of rows of said device ports and a plurality of columns of said device ports, wherein said plurality of RFID antennas comprises a plurality of row antennas and a plurality of column antennas, wherein each of said row antennas is in close physical proximity to each of said device ports in a corresponding one of said rows of said device ports, and wherein each of said column antennas is in close physical proximity to each of said device ports in a corresponding one of said columns of said device ports.

13. The apparatus of claim 12 wherein each of said column antennas comprises a single protruding portion thereof, said single protruding portion having two ends and a shape substantially equivalent to that of a letter "U", wherein said two ends of said single protruding portion are attached to said patch panel cover at a top portion and a bottom portion, respectively, thereof.

14. The apparatus of claim 12 wherein each of said row antennas comprises a plurality of protruding portions thereof, each of said plurality of protruding portions having two ends and a shape substantially equivalent to that of a letter "U", said plurality of protruding portions connected in series such that at least one of said ends of each of said protruding portions is attached to an end of another one of said protruding portions.

15. The apparatus of claim 14 wherein each of said column antennas comprises a single protruding portion thereof, said single protruding portion having two ends and a shape sub-stantially equivalent to that of a letter "U", wherein said two ends of said single protruding portion are attached to said patch panel cover at a top portion and a bottom portion, respectively, thereof.

16. The apparatus of claim 15 wherein each protruding portion of each of said column antennas has a middle portion between its two ends and each of said plurality of protruding portions comprised in each of said row antennas has a middle portion between its two ends, wherein said middle portion of said protruding portion of each of said column antennas is in close physical proximity to each of said device ports in said corresponding one of said columns of said device ports, and wherein said middle portions of each of said protruding portions of each of said row antennas is in close physical proximity to a corresponding one of said device ports in said corresponding one of said rows of said device ports.

17. The apparatus of claim 16 wherein the middle portions of each of said protruding portions of each of said row antennas is twisted by an amount approximately equal to 90 degrees, such that the middle portion of each of said protruding portions of each of said row antennas is substantially parallel to the middle portion of a corresponding one of said protruding portions of one of said column antennas.

18. The apparatus of claim 12 further comprising an antenna selector connected to each of said plurality of row antennas, the antenna selector for selecting one of said plurality of row antennas at a time for sensing RFID information therefrom.

19. The apparatus of claim 18 further comprising an RFID reader connected to said antenna selector, the RFTD reader for reading said RFII) information from one of said row antennas.

20. The apparatus of claim 19, wherein the antenna selector comprises a dual switch arrangement to reduce antenna coupling effects between said plurality of row antennas.

* * * * *